United States Patent
Weiss et al.

(10) Patent No.: US 6,913,311 B2
(45) Date of Patent: Jul. 5, 2005

(54) GUIDE MECHANISM FOR A COVER OF A SLIDING/TILTING VEHICLE ROOF

(75) Inventors: Edgar Weiss, Alzenau (DE); Hubert Bachmann, Dannstadt (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/648,912

(22) Filed: Aug. 27, 2003

(65) Prior Publication Data

US 2004/0051349 A1 Mar. 18, 2004

(30) Foreign Application Priority Data

Sep. 3, 2002 (DE) .......................................... 102 40 636

(51) Int. Cl.[7] .................................................. B60J 7/05
(52) U.S. Cl. ........................ 296/213; 296/221; 296/224; 296/216.08
(58) Field of Search ........................... 296/213, 216.08, 296/221–224

(56) References Cited

U.S. PATENT DOCUMENTS

| | | | | |
|---|---|---|---|---|
| 4,332,416 A | * | 6/1982 | Lutz et al. ................ | 296/213 |
| 4,647,104 A | * | 3/1987 | Kohlpaintner et al. ...... | 296/221 |
| 4,647,105 A | * | 3/1987 | Pollard ........................ | 296/221 |
| 5,085,622 A | | 2/1992 | Kohlpaintner et al. | |
| 5,718,472 A | * | 2/1998 | Otake et al. ................ | 296/221 |
| 6,290,289 B1 | * | 9/2001 | Ohtsu et al. ................ | 296/221 |
| 6,467,838 B2 | * | 10/2002 | Hirata ........................ | 296/221 |

FOREIGN PATENT DOCUMENTS

| | | |
|---|---|---|
| DE | 197 13 348 C | 7/1998 |
| DE | 298 11 016 U | 10/1999 |
| DE | 100 09 387 C | 5/2001 |
| DE | 100 57 012 A | 9/2001 |
| EP | 0 517 318 A1 | 12/1992 |
| EP | 0 638 452 A | 2/1995 |

OTHER PUBLICATIONS

European Search Report, dated Sep. 15, 2003.
Search report, Austrian Patent Office, dated Oct. 24, 2002.

* cited by examiner

Primary Examiner—Dennis H. Pedder
(74) Attorney, Agent, or Firm—Carlson, Gaskey & Olds

(57) ABSTRACT

A guide mechanism for a cover of a sliding roof has at least one slotted guide that is coupled to the cover and adapted to be moved between a raised position, an initial position, and a lowered position. To lock the cover against horizontal displacement in the raised position, an extension provided on the slotted guide engages with a positive fit into the profiled rail fixed to the vehicle.

17 Claims, 5 Drawing Sheets

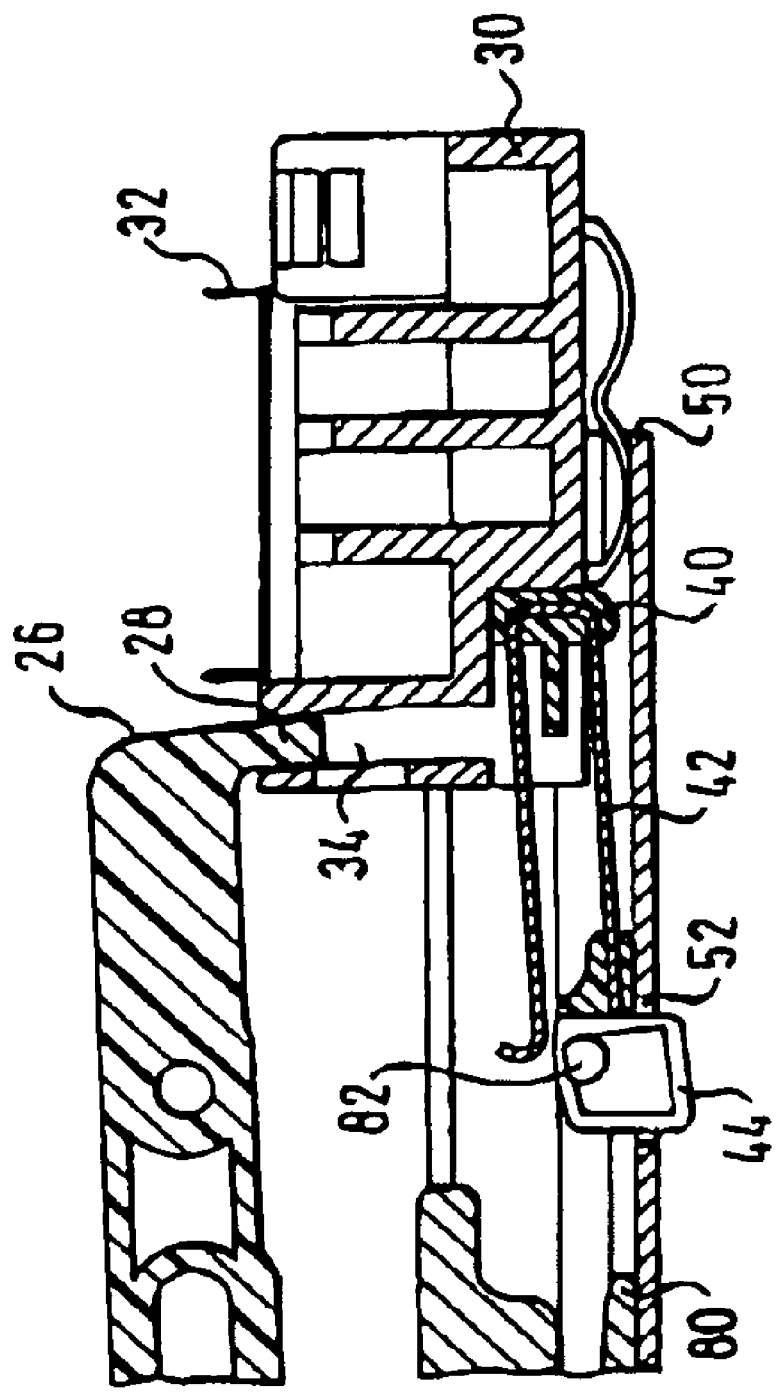

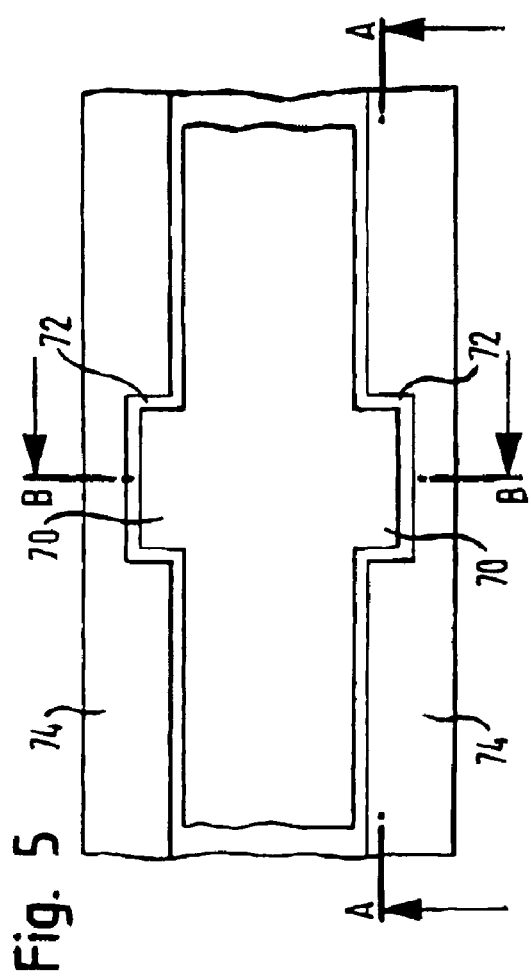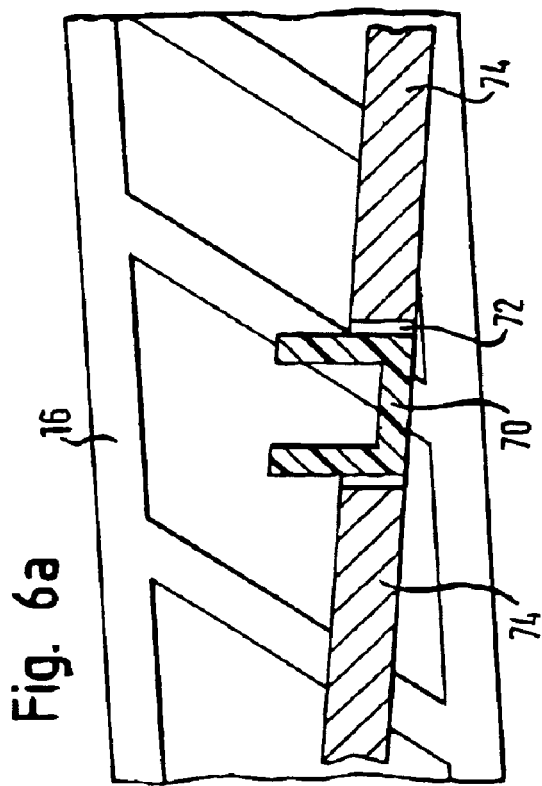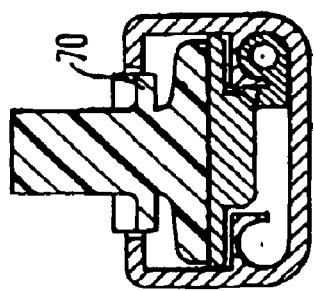

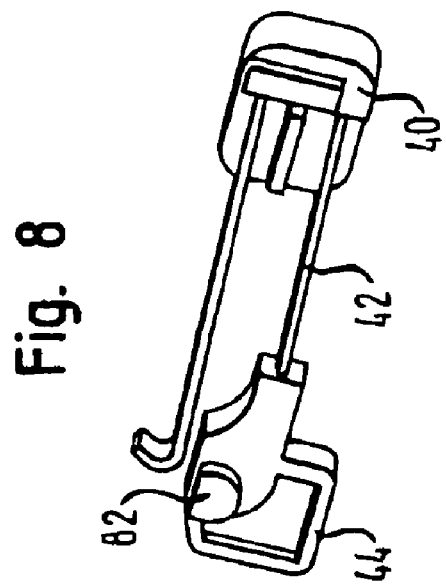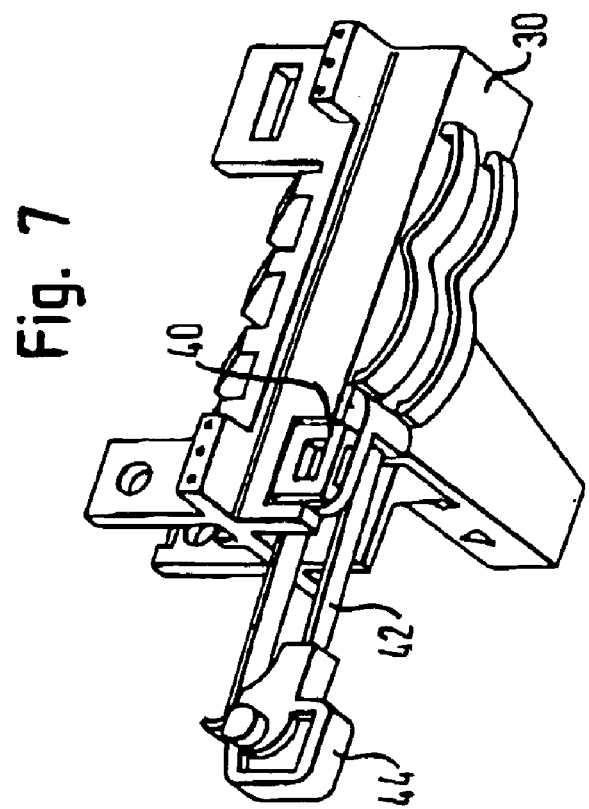

GUIDE MECHANISM FOR A COVER OF A SLIDING/TILTING VEHICLE ROOF

REFERENCE TO RELATED APPLICATIONS

The present invention claims the benefit of German Patent Application No. 102 40 636.7, filed Sep. 3, 2002.

TECHNICAL FIELD

The present invention relates to a guide mechanism for a cover of a motor vehicle sliding/tilting roof, comprising at least one slotted guide that is at least indirectly coupled to the cover and causes the cover to move vertically, the slotted guide being movable between a raised position, an initial position, and a lowered position, and further comprising at least one profiled rail for horizontal shifting of the slotted guide together with the cover along the profiled rail.

BACKGROUND OF THE INVENTION

Sliding/tilting roofs for motor vehicles often use a guide mechanism having at least one slotted guide that is at least indirectly coupled to the cover and causes the cover to move vertically, the slotted guide being movable between a raised position, an initial position, and a lowered position, and further comprising at least one profiled rail for horizontal shifting of the slotted guide together with the cover along the profiled rail. A guide mechanism of this type is known from DE 44 05 742 C1, for example. The slotted guide is a lever having a front end that is typically pivotally received in a guide shoe accommodated within the profiled rail. The slotted guide is directly or indirectly coupled to the cover. A guide track is provided on at least one of the side faces of the slotted guide for sliding movement of a sliding block along the guide track.

Movement of this sliding block causes the slotted guide to be swiveled up or down, as a result of which the cover is raised or lowered. In the raised position, the cover and the slotted guide need to be locked in position against horizontal displacement in the longitudinal direction of the vehicle (direction of displacement). This also applies to the initial position, i.e. when the cover closes the roof cutout. In the prior art, a spring-mounted lever is provided for this purpose, the lever engaging in a local recess provided in the profiled rail. The lever is seated on a bearing part having attached to it the drain gutter provided at the rear edge of the cover. The slotted guide is permanently coupled to this bearing part via an intermediate lever.

There is a desire for a guide mechanism for a cover of a sliding/tilting roof of a vehicle that has a simpler configuration, requires a lower number of parts, and ensures safe positioning of the guide mechanism and of the cover in the raised position thereof.

SUMMARY OF THE INVENTION

Accordingly, the present invention is directed to a cover of a sliding/tilting roof of a vehicle having at least one slotted guide movable that is at least indirectly coupled to the cover and causes the cover to move vertically and at least one profiled rail for horizontal shifting of the slotted guide between a raised position, an initial position, and a lowered position together with the cover along the profiled rail. In the raised position, the slotted guide is directly locked with the profiled rail with a positive fit, preventing horizontal displacement of the slotted guide in the direction of displacement. In one embodiment of the invention, the slotted guide engages directly in the profiled rail and is positively locked therein to attain a very short force flow path and little susceptibility to cumulative tolerances.

In one embodiment, the slotted guide is directly locked within the profiled rail in the initial position as well such that the slotted guide is prevented from horizontal displacement, while in the lowered position, the slotted guide is moved out of the locking engagement with the profiled rail to allow horizontal displacement.

The slotted guide preferably has at least one extension for locking engagement with a local recess provided in the profiled rail. In the lowered position, the extension reaches the space enclosed by the profiled rail and, after a horizontal displacement by means of the profiled rail, it is itself prevented from moving vertically. The extension would strike against the profiled rail if the slotted guide were moved up or down. Accordingly, the extension provides not only a locking arrangement against horizontal movement in the raised position and preferably also in the initial position, but also provides for locking against vertical shifting when in the lowered position.

In one embodiment of the invention, a drain gutter is connected with a rear bearing part that is adapted to be shifted along the profiled rail, but it may also be integrally connected with the bearing part. In the raised position, the bearing part and the drain gutter are fully decoupled from the slotted guide in the horizontal direction of displacement and have a separate arrangement for being locking in position. This allows the invention to completely omit the intermediate lever taught in the prior art.

BRIEF DESCRIPTION OF THE DRAWINGS

Further features and advantages will be apparent from the following description and from the following drawings to which reference is made and in which:

FIG. 4 shows a detail view on an enlarged scale of the rear end of the guide mechanism in the initial position;

FIG. 5 shows a top view onto a portion of the slotted guide and of the profiled rail in the area of the front end of the slotted guide;

FIGS. 6a and 6b show sectional views taken along the lines A—A and B—B, respectively, in FIG. 5;

FIG. 7 shows a perspective view of the mounting of the drain gutter with the latching hook attached thereto; and FIG. 8 shows the latching hook complete with a leaf spring and a shaped piece also injection molded to it.

DETAILED DESCRIPTION OF THE EMBODIMENTS

Figure 1:
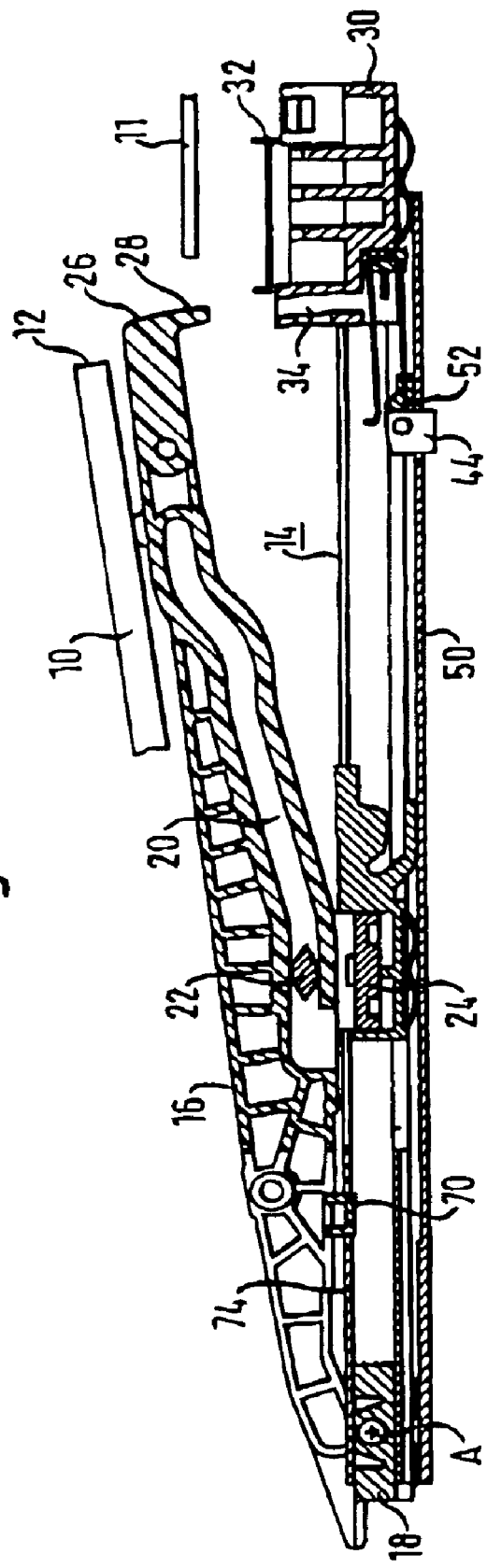
FIG. 1 shows a longitudinal sectional view through the guide mechanism in accordance with one embodiment of the invention in the raised position.

Generally, the present invention is directed to a cover of a sliding/tilting roof of a vehicle having at least one movable slotted guide that is at least indirectly coupled to the cover and that causes the cover to move vertically and at least one profiled rail for horizontal shifting of the slotted guide between a raised position, an initial position, and a lowered position together with the cover along the profiled rail. In the raised position, the slotted guide is directly locked with the profiled rail with a positive fit, preventing horizontal displacement of the slotted guide in the direction of displacement. In the guide mechanism according to one embodiment of the invention, the slotted guide engages directly in the profiled rail and is positively locked therein to attain a very short force flow path and little susceptibility to cumulative tolerances. In addition, it may be possible to reduce the number of components or to design components to exhibit reduced stability, resulting in a lower weight of the guide mechanism. "Positive fit" as used in this description means engagement in a form-fitting manner.

Preferably, the slotted guide is directly locked within the profiled rail in the initial position as well to prevent the slotted guide from being displaced horizontally. In accordance with one embodiment, the slotted guide is moved out of the locking engagement with the profiled rail when in the lowered position to allow a horizontal displacement.

The slotted guide preferably has at least one extension for locking engagement with a local recess provided in the profiled rail. This extension may be formed integrally with the slotted guide, for example. Alternatively, it would of course be possible to dispose the extension on the profiled rail for latching into a recess provided in the slotted guide.

In one embodiment, the direct locking engagement between the slotted guide and the profiled rail in the raised position constitutes the single arrangement for locking against horizontal displacement of the slotted guide to the rear (toward the tail of the vehicle).

The preferred embodiment further incorporates a pivot bearing in a front end area of the slotted guide and disposes the extension close to the front end.

The profiled rail may have a C-shaped profile with upper converging webs. At least one of the webs has a local recess provided therein for the slotted guide to enter the recess upon reaching the locked position. The local recess eliminates the need for any locking hooks or the like to be provided on the profiled rail and therefore does not require any complicated molding processes, thereby simplifying the production of the profiled rail in the invention.

In the lowered position, the extension reaches the space enclosed by the profiled rail (i.e., it is located inside the profiled rail) and, after being displaced horizontally by means of the profiled rail, it is itself prevented from moving vertically. The extension would strike against the profiled rail if the slotted guide were moved up or down. Accordingly, the extension provides not only a locking arrangement against horizontal movement in the raised position and preferably also in the initial position, but even provides for locking against vertical shifting in the lowered position.

In the area of the rear edge of the cover, there is usually provided a drain gutter extending transversely to the vehicle, which is likewise shifted along the profiled rail when the cover is shifted. According to one embodiment of the invention, the drain gutter is connected with a rear bearing part that is adapted to be shifted along the profiled rail, but it may also be integrally connected with the bearing part. In the raised position the bearing part and the drain gutter are fully decoupled from the slotted guide in the horizontal direction of displacement and have a separate arrangement for being locking in position. This allows the inventive structure to completely omit the intermediate lever used in prior art structures, which is normally used to provide for a permanent coupling between the slotted guide and the drain gutter in the prior art. This provides for a reduction in fitting space required, lower weight and fewer individual parts.

In order to ensure that the drain gutter with its associated bearing part is shifted horizontally to the rear together with the slotted guide and the cover, the slotted guide preferably engages in the bearing part to be positively coupled thereto in the horizontal direction of movement in both the initial position and the lowered position.

The invention will now be described in greater detail below with respect to the drawings. FIG. 1 illustrates one embodiment of the inventive guide mechanism for a cover 10 of a sliding/tilting roof of a vehicle in a view from the side of the vehicle. The guide mechanism serves to bring the cover 10 into the different positions, namely, the raised position, the initial position (also referred to as closed position), and the lowered position, in which the cover together with the entire guide mechanism is moved to the rear to dive under the roof. Reference numeral 11 denotes a roof edge defining a roof cutout. Reference numeral 12 denotes a rear edge of the cover 10, which is shown schematically only.

The guide mechanism is designed to be essentially identical on both sides of the cover 10; for this reason the guide mechanism is illustrated in FIG. 1 on one side only. The guide mechanism comprises a C-shaped profiled rail 14 on either side of the roof cutout, which is rigidly secured at the edge of the roof cutout and is illustrated in the Figures without the typically integrated drain channel. A lever in the form of a slotted guide 16 is made of a single-component plastic material and is indirectly or directly coupled to the cover 10. The slotted guide 16 is attached to allow swiveling movement in a front guide shoe 18 at the opposite end. The swiveling axis of the slotted guide 16 is denoted by the reference letter A in FIG. 1. The slotted guide 16 has a guide track 20 on each of its two side faces, with both guide tracks 20 having an identical design so that it is sufficient to illustrate only one of them.

A sliding block 22 in the form of a guide block runs inside each guide track 20 and is adapted to be shifted by means of a rear guide shoe 24. The rear guide shoe 24 is adapted for horizontal shifting movement via a cable drive mechanism. The front and rear guide shoes 18, 24 are received for longitudinal sliding movement inside the profiled rail 14. A rear edge 26 of the slotted guide 16 has a downwardly pointing nose 28 integrally molded to it. Below the nose 28, a bearing part 30 is received in the profiled rail 14 for horizontal sliding movement. The bearing part 30 carries a drain gutter 32. The bearing part 30 and the drain gutter 32 constitute a separate, preassembled unit. Immediately below the nose 28, the bearing part 30 features a recess 34 adapted in shape to receive the nose 28.

Below the recess 34, the bearing part 30 has a lateral opening for receiving a shaped piece 40 that is connected with a latching hook 44 via a U-shaped leaf spring 42. The shaped piece 40, leaf spring 42 and latching hook 44 constitute a preassembled unit (FIG. 8), which can be produced by injection molding the shaped piece 40 and the latching hook 44 onto the leaf spring 42.

As shown in FIGS. 1 and 7, in the fitted condition the latching hook 44 projects from the bearing part 30 forward.

In the raised position and in the initial position, predefined positions are required for the unit made up of the cover 10, the slotted guide 16 and the parts of the guide mechanism coupled to it and for the unit made up of the drain gutter 32 and the bearing part 30 on either side thereof. Any horizontal displacement needs to be prevented at these positions.

Figure 2:
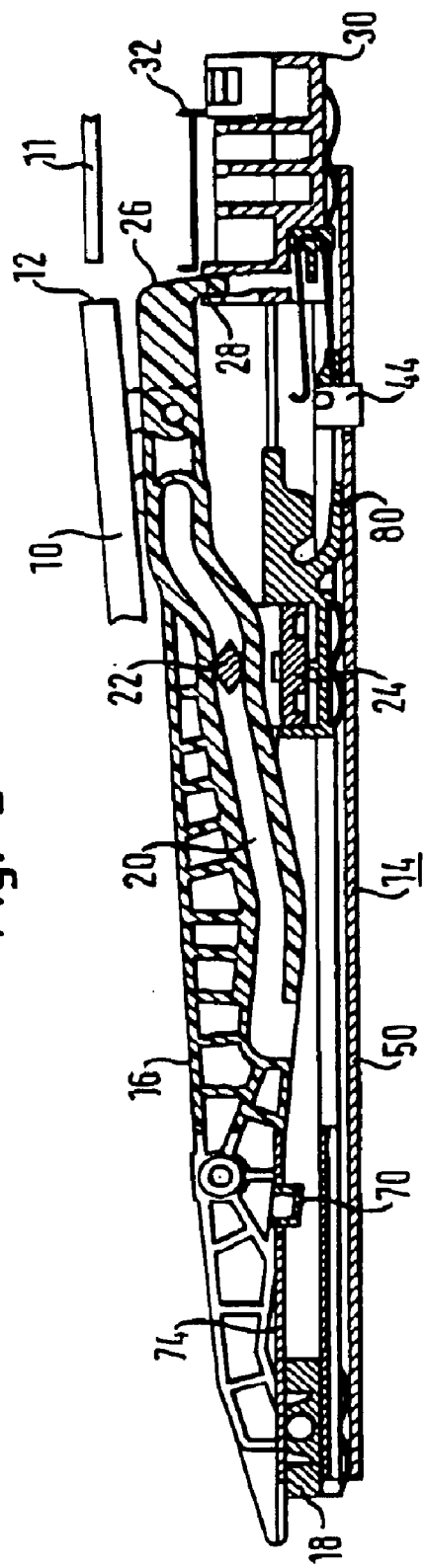
FIG. 2 shows a longitudinal sectional view through the guide mechanism in accordance with one embodiment of the invention in the initial position.

In the raised position and in the initial position, the lower connecting web 50 of the profiled rail 14 has a local recess 52 for engagement by the latching hook 44 (see FIGS. 1 and 2). The latching hook 44 is urged downward by the force of the leaf spring 42. In this way the latching hook 44 secures the drain gutter 32 in position horizontally (see also FIG. 4).

The other unit, comprising the cover 10 along with the slotted guide 16 and the front and rear guide shoes 18, 24, is fixed in position horizontally by means of a positive locking connection directly between die slotted guide 16 and the profiled rail 14 via corresponding locking portions. In one embodiment, the slotted guide 16 has laterally projecting extensions 70 integrally molded to its side faces (see FIGS. 1 through 3, 5 and 6a and 6b) close to its swiveling axis A. The laterally projecting extensions 70 protrude into associated local recesses 72 in the upper webs 74 of the profiled rail 14. The positioning and the height of the extensions 70 is such that they will protrude into the recesses 72 in both the raised and the initial positions (FIGS. 1 and 2) and would strike against the webs 74 if an attempt were made to shift the slotted guide 16 and the cover 10 with it in a horizontal direction. On the other hand, the extensions 70 are positioned such that in the lowered position, they will move below the webs 74 and are then located fully within the space circumscribed by the profiled rail 14 (see FIG. 3).

The mode of operation of the guide mechanism according to the invention will now be explained. In the initial position, the extensions 70 protrude into the recesses 72 (FIGS. 2 and 6) so that the slotted guide 16 is prevented from any horizontal displacement along the profiled rail 14. The nose 28 projects into its associated recess 34 in the bearing part 30 so that the unit defined by the slotted guide 16 is positively coupled to the unit defined by the drain gutter 32 in the direction of displacement. The latching hook 44 protrudes into the recess 52 (FIG. 4) so that an additional locking arrangement is provided in the initial position.

When the cover 10 is to be raised, the rear guide shoe 24 is shifted forward, preferably driven by a motor. The sliding block 22 sliding along in the guide track 20 acts to swivel the slotted guide 16 upward (FIG. 1). In the fully raised position, when the nose 28 has cleared the recess 34, the unit comprising the slotted guide 16 and the cover 10 is completely decoupled mechanically from the unit including the drain gutter 32. In this position, the two units am locked against horizontal displacement by the associated extensions 70 and by the latching hook 44, respectively (i.e. by arrangements of their own for locking these two units in position).

Figure 3:
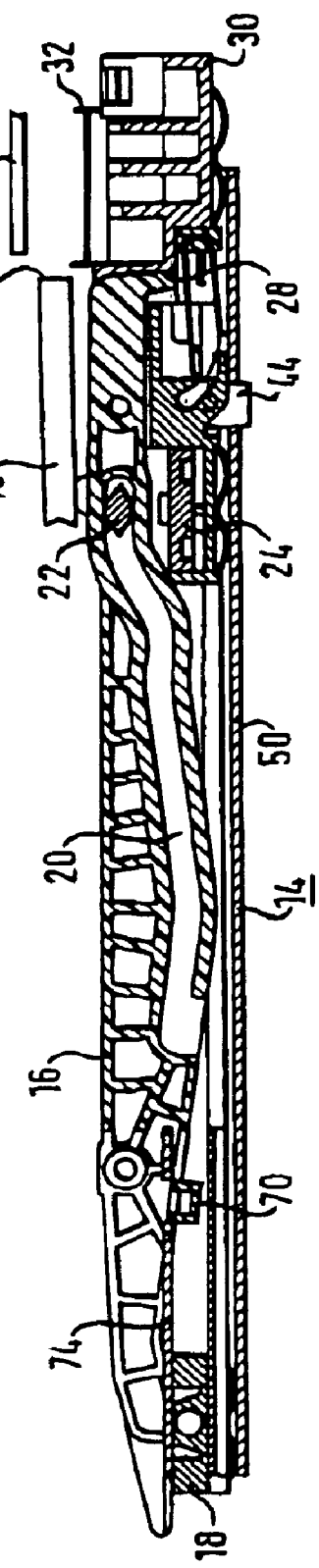
FIG. 3 shows a longitudinal sectional view through the guide mechanism in accordance with one embodiment of the invention in the lowered position.

When the cover 10 is to be shifted to the rear, the rear edge 12 thereof needs to dive below the level of the edge 11. The rear guide shoe 24 is therefore shifted to the rear (FIG. 3). In the lowered position, the extensions 70 will dive below the webs 74, as discussed above (FIG. 3). The rear guide shoe 24 is shifted further to the rear so that a wedge-shaped extension 80 thereon, which projects toward the latching hook 44 (FIGS. 2 and 4), engages lateral tappets 82 provided on the latching hook 44 to move the latter upward into a disengaged position. The two units coupled with each other may now be shifted horizontally together.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A guide mechanism for a movable cover of a roof in a vehicle, comprising at least one slotted guide coupled to the cover and movable between a raised position, an initial position, and a lowered position, wherein said at least one slotted guide causes the cover to move vertically, said at least one slotted guide having a first locking portion; and at least one profiled rail that guides said at least one slotted guide horizontally together with the cover along said at least one profiled rail, said at least one profiled rail defining a second locking portion, wherein the first and second locking portions directly engage with each other to directly engage the first locking portion of said at least one slotted guide with said at least one profiled rail when said at least one slotted guide is in the raised position and in the initial position to prevent horizontal displacement of said at least one slotted guide.

2. The guide mechanism as claimed in claim 1, wherein the first and second locking portions engage with each other to lock said at least one slotted guide with said at least one profiled rail when said at least one slotted guide is in the initial position to prevent horizontal displacement of said at least one slotted guide.

3. The guide mechanism as claimed in claim 1, wherein the first and second locking portions disengage to move said at least one slotted guide out of locking engagement with said at least one profiled rail when said at least one slotted guide is in the lowered position.

4. The guide mechanism as claimed in claim 1, wherein the first and second locking portions are sole structures in the guide mechanism for forming a locking engagement between said at least one slotted guide and said at least one profiled rail in the raised position to prevent horizontal rearward displacement of said at least one slotted guide.

5. The guide mechanism as claimed in claim 1, wherein the first locking portion comprises at least one extension on said at least one slotted guide and the second locking portion comprises at least one recess in said at least one profiled rail, wherein said at least one extension and said at least one recess engage in locking engagement to prevent horizontal displacement of said at least one slotted guide.

6. The guide mechanism as claimed in claim 5, further comprising a pivot bearing disposed at a front end of said at least one slotted guide and wherein the extension is provided close to the front end.

7. The guide mechanism as claimed in claim 5, wherein said at least one profiled rail has a C-shaped profile with upper converging webs, wherein at least one of said upper converging webs has said at least one recess.

8. The guide mechanism as claimed in claim 5, wherein the extension extends below the recess when said at least one slotted guide is in the lowered position, and wherein said at least one profiled rail prevents the extension from rising vertically after said at least one slotted guide is displaced horizontally when in the lowered position.

9. The guide mechanism as claimed in claim 1, further comprising:

a drain gutter disposed at a rear edge of the cover, wherein the drain gutter extends generally transversely with respect to said at least one profiled rail; and a bearing part connected to the drain gutter and adapted to be shifted along said at least one profiled rail, wherein the bearing part and the drain gutter are spaced apart from said at least one slotted guide in the raised position.

10. A guide mechanism for a movable cover of a roof in a vehicle, comprising at least one slotted guide coupled to the cover and movable between a raised position, an initial position, and a lowered position, wherein said at least one slotted guide causes the cover to move vertically, said at least one slotted guide having a first locking portion;

at least one profiled rail that guides said at least one slotted guide horizontally together with the cover along said at least one profiled rail, said at least one profiled rail having a second locking portion, wherein the first and second locking portions engage with each other to lock said at least one slotted guide with said at least one profiled rail when said at least one slotted guide is in the raised position to prevent horizontal displacement of said at least one slotted guide;

a drain gutter disposed at a rear edge of the cover, wherein the drain gutter extends generally transversely with respect to said at least one profiled rail; and a bearing part connected to the drain gutter and adapted to be shifted along said at least one profiled rail, wherein, in the initial position and in the lowered position, a portion of said at least one slotted guide engages a portion of the bearing part and is positively coupled thereto in the horizontal direction, and wherein the bearing part and the drain gutter are spaced apart from said at least one slotted guide in the raised position.

11. The guide mechanism as claimed in claim 10, further comprising a nose molded to a rear edge of said at least one slotted guide, wherein the nose engages a recess in the bearing part.

12. A guide mechanism for a movable cover of a roof in a vehicle, comprising at least one slotted guide coupled to the cover and movable between a raised position, an initial position, and a lowered position, wherein said at least one slotted guide causes the cover to move vertically, said at least one slotted guide defining a first locking portion;

at least one profiled rail that guides said at least one, slotted guide horizontally together with the cover along said at least one profiled rail, said at least one profiled rail defining a second locking portion, wherein the first and second locking portions engage with each other to directly engage the slotted guide with said at least one profiled rail when said at least one slotted guide is in the raised position and in the initial position to prevent horizontal displacement of said at least one slotted guide, and wherein the first and second locking portions disengage to move said at least one slotted guide out of locking engagement with said at least one profiled rail when said at least one slotted guide is in the lowered position;

a drain gutter disposed at a rear edge of the cover, wherein the drain gutter extends generally transversely with respect to said at least one profiled rail; and a bearing part connected to the drain gutter and adapted to be shifted along said at least one profiled rail, wherein the bearing part and the drain gutter are spaced apart from said at least one slotted guide in the raised position.

13. The guide mechanism as claimed in claim 12, wherein the first and second locking portions are the sole structures in the guide mechanism for forming a locking engagement between said at least one slotted guide and said at least one profiled rail in the raised position to prevent horizontal rearward displacement of said at least one slotted guide.

14. The guide mechanism as claimed in claim 12, wherein the first locking portion comprises at least one extension on said at least one slotted guide and the second locking portion comprises at least one recess in said at least one profiled rail, wherein the extension and recess engage in locking engagement to prevent horizontal displacement of said at least one slotted guide.

15. The guide mechanism as claimed in claim 14, further comprising a pivot bearing disposed at a front end of said at least one slotted guide, wherein the extension is provided close to the front end.

16. The guide mechanism as claimed in claim 14, wherein the extension extends below the recess when said at least one slotted guide is in the lowered position, and wherein said at least one profiled rail prevents the extension from rising vertically after said at least one slotted guide is displaced horizontally when in the lowered position.

17. A guide mechanism for a movable cover of a roof in a vehicle, comprising:

at least one slotted guide coupled to the cover and movable between a raised position, an initial position, and a lowered position, wherein said at least one slotted guide causes the cover to move vertically, said at least one slotted guide having a first locking portion;

at least one profiled rail that guides the slotted guide horizontally together with the cover along said at least one profiled rail, said at least one profiled rail having a second locking portion, wherein the first and second locking portions engage with each other to lock the slotted guide with said at least one profiled rail with a positive fit when said at least one slotted guide is in the raised position and in the initial position to prevent horizontal displacement of said at least one slotted guide, and wherein the first and second locking portions disengage to move said at least one slotted guide out of locking engagement with said at least one profiled rail when said at least one slotted guide is in the lowered position;

a drain gutter disposed at a rear edge of the cover, wherein the drain gutter extends transversely with respect to the vehicle;

a bearing part connected to the drain gutter and adapted to be shifted along said at least one profiled rail, wherein the bearing part and the drain gutter are spaced apart from said at least one slotted guide in the raised position; and a nose molded to a rear edge of said at least one slotted guide, wherein, in the initial position and in the lowered position, the nose engages the bearing part to positively couple said at least one slotted guide and the bearing part in the horizontal direction.

* * * * *